(12) United States Patent
Li et al.

(10) Patent No.: US 10,081,754 B2
(45) Date of Patent: Sep. 25, 2018

(54) GEL COMPOSITIONS FOR HYDRAULIC FRACTURING APPLICATIONS

(71) Applicants: Kemira Oyj, Helsinki (FI); Jiang Li, Johns Creek, GA (US); Roopa Tellakula, Suwanee, GA (US)

(72) Inventors: Jiang Li, Johns Creek, GA (US); Roopa Tellakula, Suwanee, GA (US)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 14/770,668

(22) PCT Filed: Feb. 28, 2014

(86) PCT No.: PCT/US2014/019599
§ 371 (c)(1),
(2) Date: Aug. 26, 2015

(87) PCT Pub. No.: WO2014/134541
PCT Pub. Date: Sep. 4, 2014

(65) Prior Publication Data
US 2016/0009983 A1    Jan. 14, 2016

Related U.S. Application Data

(60) Provisional application No. 61/770,620, filed on Feb. 28, 2013, provisional application No. 61/874,201, (Continued)

(51) Int. Cl.
*C09K 8/66* (2006.01)
*C09K 8/12* (2006.01)
(Continued)

(52) U.S. Cl.
CPC ............... *C09K 8/12* (2013.01); *C09K 8/685* (2013.01); *C09K 8/805* (2013.01); *C09K 8/88* (2013.01);
(Continued)

(58) Field of Classification Search
None
See application file for complete search history.

(56) References Cited

U.S. PATENT DOCUMENTS 3,302,717 A   2/1967  West et al.
3,556,932 A   1/1971  Coscia et al.
(Continued)

FOREIGN PATENT DOCUMENTS

EP         0291182        11/1988
WO    WO 2000/060023     10/2000
(Continued)

OTHER PUBLICATIONS

International Search Report for PCT Patent Application No. PCT/US2014/019599, dated Jun. 23, 2014.

*Primary Examiner* — Jeffrey D Washville
(74) *Attorney, Agent, or Firm* — King & Spalding (57) ABSTRACT

Gel compositions comprising an acrylamide polymer or copolymer crosslinked with dialdehyde, methods to produce the gel compositions, wellbore treatment fluids comprising the gel compositions, and methods of treating a well bore comprising injecting the gel compositions, are provided. In the drilling, completion, and stimulation of oil and gas wells, well treatment fluids are often pumped into well bore holes under high pressure and at high flow rates causing the rock formation surrounding the well bore to fracture.

16 Claims, 2 Drawing Sheets

Related U.S. Application Data filed on Sep. 5, 2013, provisional application No. 61/874,213, filed on Sep. 5, 2013.

(51) Int. Cl.
  *C09K 8/68* (2006.01)
  *C09K 8/80* (2006.01)
  *C09K 8/88* (2006.01)

(52) U.S. Cl.
  CPC .......... *C09K 8/887* (2013.01); *C09K 2208/12* (2013.01); *C09K 2208/28* (2013.01); *C09K 2208/32* (2013.01)

(56) References Cited

U.S. PATENT DOCUMENTS

| | | | |
|---|---|---|---|
| 4,155,405 A * | 5/1979 | Vio | C09K 8/512 166/295 |
| 4,217,425 A | 8/1980 | Ballweber et al. | |
| 4,605,702 A | 8/1986 | Guerro et al. | |
| 4,782,900 A * | 11/1988 | Fung | C09K 8/512 166/270 |
| 5,246,073 A | 9/1993 | Sandiford et al. | |
| 2006/0116296 A1* | 6/2006 | Kippie | C09K 8/12 507/244 |
| 2006/0142535 A1 | 6/2006 | Cyr et al. | |
| 2008/0058229 A1 | 3/2008 | Berkland et al. | |
| 2008/0067138 A1 | 3/2008 | Burgess et al. | |
| 2008/0149287 A1 | 6/2008 | Hagiopol et al. | |
| 2014/0158355 A1* | 6/2014 | Wuthrich | C09K 8/588 166/294 |

FOREIGN PATENT DOCUMENTS

| | | |
|---|---|---|
| WO | WO 2006/068964 | 6/2006 |
| WO | WO 2008/0149287 | 6/2008 |
| WO | WO 2008/115338 | 9/2008 |
| WO | WO 2013/188413 | 12/2013 |

* cited by examiner

GEL COMPOSITIONS FOR HYDRAULIC FRACTURING APPLICATIONS

CROSS REFERENCE TO RELATED APPLICATIONS

This application is a national stage application under 35 U.S.C. § 371 of International Application No. PCT/US2014/019599, filed on Feb. 28, 2014, which claims priority to U.S. Provisional Application No. 61/770,620, filed on Feb. 28, 2013; U.S. Provisional Application No. 61/874,201, filed on Sep. 5, 2013; and U.S. Provisional Application No. 61/874,213, filed on Sep. 5, 2013; each of which are incorporated herein by reference in their entirety.

FIELD OF THE ART

The present disclosure generally relates to gel compositions and wellbore treatment fluids for use in hydraulic fracturing applications.

BACKGROUND

In the drilling, completion, and stimulation of oil and gas wells, well treatment fluids are often pumped into well bore holes under high pressure and at high flow rates causing the rock formation surrounding the well bore to fracture. A type of well treatment commonly utilized for stimulating hydrocarbon production from a subterranean zone penetrated by a well bore is hydraulic fracturing. Hydraulic fracturing, also referred to as fracing (or fracking), is used to initiate production in low-permeability reservoirs and re-stimulate production in older producing wells. In hydraulic fracing, a fluid composition is injected into the well at pressures effective to cause fractures in the surrounding rock formation. Fracing is used both to open up fractures already present in the formation and create new fractures. Proppants, such as sand and ceramics, are used to keep induced fractures open both during and after fracturing treatment. To place the proppants inside the fracture, the proppant particles are suspended in a fluid that is pumped into the subterranean formation. Generally, this fluid has a viscosity sufficient to maintain suspension of the particles.

For ideal performance, a hydraulic fracturing fluid should be sufficiently viscous to create a fracture of adequate width and be able to transport large quantities of proppants into the fracture. The viscosity of the fluid can be enhanced or modified by addition of synthetic and/or natural polymers, or other rheology modifiers. Examples of polymer-enhanced fluids used to increase the viscosity of hydraulic fracturing fluids include slickwater systems, linear gel systems, and crosslinked gel systems. Of these, crosslinked gel systems are the most viscous.

In a crosslinked gel system, a linear polymer or gel, for example, a fluid based on guar or modified guar, is crosslinked with added reagents such as borate, zirconate, and titanate in the presence of alkali. The most common version of crosslinked gel is known in the art as guar-borate gel. The crosslinked gel fluid increases the viscosity of the fracturing fluid, such that proppants can be effectively suspended.

Once the hydraulic fracturing fluid has delivered proppant to the fracture or delivered sand in gravel packing or frac packing operations, it is often desirable to lower the viscosity of the fracturing fluid such that the fluid can be recovered from the formation using minimal energy. The removal of the spent fracturing fluids from the subterranean formation is typically required to allow hydrocarbon production. This reduction in viscosity of the fracturing fluid is often achieved using a breaker, i.e., a compound that breaks the cross-linking bonds within the gel.

Synthetic polymers, for example polyacrylamide (PAM) polymers, can form permanent gels under acidic conditions with metal crosslinking agents, such as aluminum-, chromium-, zirconium- and titianium-based complexes. Such gels can be used, for example, to control conformance in enhanced oil recovery (EOR) applications, where subsequent breaking to significantly reduce viscosity is not necessary. However, for fracing fluid applications, the acidity of the formation in hydraulic fracturing is usually not high, and breaking of the crosslinked gel improves fluid recovery.

SUMMARY

Disclosed herein are gel compositions comprising an acrylamide polymer or copolymer having a charge between about 5% to about 35%, or more specifically about 15% to about 20%, and dialdehyde. The gel composition is formed by combining the acrylamide polymer or copolymer and dialdehyde in an aqueous solution at a pH in the range of about 7.5 to about 11, wherein the molar ratio of dialdehyde to monomers of the acrylamide polymer or copolymer is in the range of about greater than about 0.2 to about 2.0.

Methods to produce the gel composition, methods of treating a wellbore comprising injecting the gel composition into a wellbore, and well treatment fluids comprising the gel composition are also disclosed herein.

Further, methods of treating a wellbore comprising injecting a composition comprising an acrylamide polymer or copolymer having a charge between 15% to 20% into a wellbore; injecting a composition comprising dialdehyde into the wellbore, and injecting a pH modifying agent into the wellbore in an amount sufficient to produce a downhole solution pH in the range of about 7.5 to about 11, to produce an in-situ gel composition comprising an acrylamide polymer or copolymer crosslinked with dialdehyde.

Wellbore treatment fluids comprising an acrylamide polymer or copolymer and dialdehyde are also disclosed herein. The wellbore treatment fluid may be formed (in whole or in part) prior to injection into the wellbore or in situ, where the acrylamide polymer/copolymer and the crosslinker are added to the wellbore separately. The wellbore treatment fluid may optionally comprise one or more additional components, such as proppants and pH control agents.

The disclosure may be understood more readily by reference to the following detailed description of the various features of the disclosure and the examples included therein.

DETAILED DESCRIPTION

The present disclosure provides cross-linked gel compositions which comprise an acrylamide polymer or copolymer and dialdehyde. The gel compositions are useful for increasing the viscosity of hydraulic fracturing fluids. In particular, the gel compositions have a charge (mole percent) within a specific range that is especially useful for viscosifying wellbore treatment fluids, enhancing delivery of proppants into fractures. The exemplary gel compositions may break under certain conditions, which can increase fluid recovery in hydraulic fracturing applications. The exemplary gel compositions can be used as a synthetic replacement for crosslinked guar compositions in hydraulic fracturing applications, with comparable performance. Like guar gels, the exemplary gel compositions provide high viscosity with a relatively low amount of active polymer in the composition. Exemplary gel compositions may be easier to manufacture, and of a more reliable quality, than guar gels.

Gel Compositions

In one aspect, the present invention is a gel composition comprising an acrylamide polymer or copolymer crosslinked with dialdehyde.

As used herein, the term "acrylamide polymer" refers to a homopolymer of acrylamide and encompasses acrylamide polymers chemically modified (e.g., hydrolyzed) following polymerization.

As used herein the term "acrylamide copolymer" refers to a polymer comprising an acrylamide monomer and one or more comonomers. The comonomer may be anionic, cationic or non-ionic. In certain embodiments, the comonomer is hydrophobic. The acrylamide copolymer may be unmodified or chemically modified. Representative, non-limiting co-monomers include acrylic acid, vinyl acetate, vinyl alcohol and/or other unsaturated vinyl monomers.

In one embodiment, the acrylamide copolymer comprises an anionic comonomer. In some embodiments, the anionic monomer is selected from the group consisting of (meth)acrylic acid, alkali/alkaline/ammonium salts of (meth)acrylic acid, 2-acrylamido-2-methylpropanesulfonic acid, alkali/alkaline/ammonium salts of 2-acrylamido-2-methylpropanesulfonic acid, maleic acid, alkali/alkaline/ammonium salts of maleic acid and the like.

In another embodiment, the acrylamide copolymer comprises a cationic comonomer. In some embodiments, the cationic monomer is selected from the group consisting of (meth)acrylamidoethyltrimethylammonium chloride, (meth)acrylamido propyltrimethylammonium chloride and the like.

In another embodiment, the acrylamide copolymer comprises a non-ionic comonomer. In some embodiments, the non-ionic monomer is selected from the group consisting of (meth)acrylamide, maleic anhydride.

In an exemplary embodiment, the acrylamide copolymer comprises an acrylamide monomer and an anionic comonomer, but does not include a cationic comonomer.

In one embodiment, the acrylamide polymer or copolymer is characterized by a charge of about 0% to about 40%, about 5% to about 35%, about 15% to about 30%, about 15% to about 20% or about 20% to about 30%. In one embodiment, the charge is in the range of about 5% to about 35% and provides a particularly high viscosity that provides substantial suspending power. In another embodiment, the charge is in the range of about 15% to about 20% and provides a particularly high viscosity that provides substantial suspending power.

In another embodiment, the acrylamide polymer or copolymer is characterized by a charge of about 10%, about 15%, about 20%, about 25%, about 30%, about 35% or about 40%.

The range of charge for the gel composition disclosed herein is a function of the charge of the polyacrylamide copolymer comprising charged monomers or the chemically modified polyacrylamide polymer or copolymer.

In a particular embodiment, the acrylamide copolymer comprises from about 30 to about 90, about 40 to about 80, about 50 to about 70 or about 60 mole % acrylamide.

In a particular embodiment, the weight ratio of the acrylamide monomer to the one or more comonomers is about 10:90 to 90:10.

In a particular embodiment, the acrylamide polymer or copolymer is characterized by a degree of hydrolysis of about 5 to about 10%, about 10 to about 15%, about 15 to about 20%, about 20 to about 25%, about 25 to about 30% or greater than about 30%. In a more particular embodiment, the acrylamide polymer or copolymer is characterized by a degree of hydrolysis of about 15, about 16, about 17, about 18, about 19 or about 20%.

In one embodiment, acrylamide polymers or copolymers are water dispersible.

In one embodiment, the acrylamide polymer or copolymer has a weight average molecular weight of greater than or equal to about 0.5 million g/mol. In another embodiment, the acrylamide polymer or copolymer has a weight average molecular weight of in the range of about 0.5 million g/mol to about 30 million g/mol.

The liquid used to form the gel composition any suitable aqueous liquid that does not adversely react with the acrylamide polymer or copolymer, such as fresh water, salt water, brine, or any other aqueous liquid.

The dialdehyde used to cross-link the acrylamide polymer or copolymer may be any suitable dialdehyde. Representative, non-limiting examples of dialdehydes include glyoxal, malondialdehyde, succindialdehyde, glutaraldehyde, adipaldehyde, o-phthaldehyde, m-phthaldehyde, p-phthaldehyde, and combinations and mixtures thereof.

In one embodiment, the dialdehyde is a glyoxal.

In one embodiment, the gel composition comprises an acrylamide polymer, crosslinked with glyoxal. In a particular embodiment, the gel composition comprises an acrylamide polymer crosslinked with glyoxal, wherein the acrylamide polymer is characterized by a charge in range of about 5% to about 40% and provides a particularly high viscosity that provides substantial suspending power. In one embodiment, the charge is in the range of about 15% to about 20% and provides a particularly high viscosity that provides substantial suspending power. In a particular embodiment, the charge is about 10%, about 15%, about 20%, about 25%, about 30%, about 35% or about 40%.

In another embodiment, the gel composition comprises an acrylamide copolymer crosslinked with glyoxal. In a particular embodiment, the gel composition comprises an acrylamide copolymer crosslinked with glyoxal, wherein the acrylamide copolymer is characterized by a charge in range of about 5% to about 40% and provides a particularly high viscosity that provides substantial suspending power. In one embodiment, the charge is in the range of about 15% to about 20% and provides a particularly high viscosity that provides substantial suspending power. In a particular embodiment, the charge is about 10%, about 15%, about 20%, about 25%, about 30%, about 35% or about 40%.

The amount of the acrylamide polymer or copolymer in the gel composition may depend, for example, on the particular polymer/copolymer used, the purity of the polymer/copolymer, and properties desired in the final composition. In one embodiment, the gel composition comprises from about 0.05 to about 5% by weight polymer or copolymer, from about 0.1 to about 1% or from about 0.2 to about 5% by weight polymer or copolymer, based on the total weight of the composition. In another embodiment, the gel composition comprises about 5, about 0.1 to about 3, about 0.2 to about 2, or about 0.3 to about 1% by weight percent polymer or copolymer based on the total weight of the composition.

In exemplary embodiments, the gel composition comprises from about 0.1% to about 25% of acrylamide polymer or copolymer, by weight of the composition. In certain embodiments, the gel composition comprises from about 0.01% to about 25% acrylamide polymer or copolymer, by weight of the composition.

In one embodiment, the gel composition comprises an acrylamide polymer or copolymer crosslinked with glyoxal wherein the polymer or copolymer (i) comprises about 0.05 to about 5% by weight polymer/copolymer and (ii) is characterized by a charge in range of about 5% to about 40%, and more particularly about 15 to about 20%.

In one embodiment, the gel composition has a dialdehyde to monomer ratio of from about 0.2 to about 2.0. In exemplary embodiments, the molar ratio of dialdehyde to monomers of the acrylamide polymer or copolymer is greater than about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0. In exemplary embodiments, the molar ratio of dialdehyde to monomers of the acrylamide polymer or copolymer is in the range of about greater than about 0.2 to about 2.0, about 0.5 to about 2.0, about 0.7 to about 2.0, about 0.8 to about 2.0, about 1.0 to about 2.0, about 1.1 to about 2.0, or about 1.0 to about 1.5. In a particular embodiment, the molar ratio of dialdehyde to monomers of the acrylamide polymer or copolymer is greater than about 1.0.

In one embodiment, the gel composition comprises an acrylamide polymer or copolymer crosslinked with glyoxal wherein (i) the polymer or copolymer comprises about 0.05 to about 5% by weight polymer/copolymer and is characterized by a charge in range of about 5% to about 40%, and more particularly about 15 to about 20% and (ii) the molar ratio of dialdehyde to monomers of the acrylamide polymer or copolymer is about 0.2 to about 2.0.

In exemplary embodiments, the gel compositions according to the embodiments have a viscosity of greater than or equal to about 100 cP at about 100 sec-1. The viscosity of the gel may composition may be controlled by varying the concentrations of the crosslinking agent and polymer. In a particular embodiment, the gel composition has a viscosity greater than about 150, or greater than about 200, or greater than about 250 cP, or greater than about 400 cP at about 100 sec-1.

In one embodiment, the gel composition comprises an acrylamide polymer or copolymer crosslinked with glyoxal, wherein (i) the polymer/copolymer comprises about 0.05 to about 5% by weight polymer/copolymer and is characterized by a charge in range of about 5% to about 40%, and more particularly about 15 to about 20% and (ii) the molar ratio of dialdehyde to monomers of the acrylamide polymer or copolymer is about 0.2 to about 2.0; and (iii) the gel composition has a viscosity of greater than or equal to about 100 cP at about 100 sec-1.

Wellbore Fluid Compositions

In a second aspect, the present invention is a wellbore fluid composition comprising an acrylamide polymer or copolymer crosslinked with dialdehyde.

The acrylamide polymer or copolymer may be any suitable acrylamide polymer or copolymer, such as those described above.

The necessary or desired amounts of the acrylamide polymer or copolymer and dialdehyde may be determined based on various factors, including, for example, assumptions about the downhole conditions. The presence of a gel down hole may be determined by other indicators other than rheological measurements.

In exemplary embodiments, a wellbore fluid composition may contain from about 0.05 to about 5%, from about 0.1 to about 1%, or from about 0.2 to about 5% by weight acrylamide polymer or copolymer, based on the total weight of the composition.

In exemplary embodiments, the dialdehyde to monomer ratio is from about 0.2 to about 2.0. In exemplary embodiments, the molar ratio of dialdehyde to monomers of the acrylamide polymer or copolymer is greater than about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0. In exemplary embodiments, the molar ratio of dialdehyde to monomers of the acrylamide polymer or copolymer is in the range of about greater than about 0.2 to about 2.0, about 0.5 to about 2.0, about 0.7 to about 2.0, about 0.8 to about 2.0, about 1.0 to about 2.0, about 1.1 to about 2.0, or about 1.0 to about 1.5. In a particular embodiment, the molar ratio of dialdehyde to monomers of the acrylamide polymer or copolymer is greater than about 1.0.

In exemplary embodiments, the wellbore fluid composition comprises an acrylamide polymer or copolymer crosslinked by dialdehyde and a pH modifying agent.

In certain embodiment, the wellbore fluid composition is formed (in whole or in part) prior to injection into the wellbore. In other embodiments, the wellbore fluid composition is formed (in whole or in part) in situ (i.e., in the wellbore). Where the wellbore fluid composition is formed in situ, the components of the well fluid composition may be injected into the wellbore simultaneously or sequentially, in any order.

In exemplary embodiments, the wellbore fluid composition is formed in situ by injecting (i) a composition comprising an acrylamide polymer or copolymer and a pH modifying agent and (ii) a composition comprising dialdehyde, where the injection of (i) and (ii) occurs simultaneously or sequentially, in any order.

In exemplary embodiments, the wellbore fluid composition is formed in situ by injecting (i) a composition comprising dialdehyde and a pH modifying agent and (ii) a composition comprising an acrylamide polymer or copolymer, where the injection of (i) and (ii) occurs simultaneously or sequentially, in any order.

In exemplary embodiments, the wellbore fluid composition is formed in situ by injecting (i) a composition comprising an acrylamide polymer or copolymer; (ii) a composition comprising dialdehyde may be combined; and (iii) a composition comprising a pH modifying agents, wherein the injection of (i)-(iii) occurs simultaneously or sequentially, in any order.

In exemplary embodiments, the pH modifying agent is any suitable pH modifying agent and may be in the form of an aqueous solution, for example an aqueous solution comprising a base, an acid, a pH buffer, or any combination thereof. In exemplary embodiments, the pH modifying agent is a potassium carbonate and potassium hydroxide mixture or a sodium bicarbonate and sodium carbonate mixture. In exemplary embodiments, a wellbore treatment fluid comprises a gel composition as described herein.

In exemplary embodiments, the wellbore treatment fluid optionally comprises a proppant, for example natural or synthetic proppants, including but not limited to glass beads, ceramic beads, sand, gravel, and bauxite and combinations thereof. Exemplary proppants may be coated or contain chemicals; more than one can be used sequentially or in mixtures of different sizes or different materials. The proppant may be resin coated (curable), or pre-cured resin coated. The proppant may be any suitable shape, including substantially spherical materials, fibrous materials, polygonal materials (such as cubic materials), and combinations thereof. In one embodiment, the proppant is a reduced density proppant.

In exemplary embodiments, the wellbore treatment fluids comprising the gel compositions, or dialdehyde and acrylamide polymer or copolymer compositions for forming the gel compositions, can be used in any well treatment fluid where viscosification is desired including but not limited to stimulation and completion operations. For example, the wellbore treatment fluid can be used for hydraulic fracturing applications. In these applications, the fracturing fluid, i.e. wellbore treatment fluid, can be configured as a gelled fluid, a foamed gel fluid, acidic fluids, water and potassium chloride treatments, and the like. The fluid is injected at a pressure effective to create one or more fractures in the subterranean formation. Depending on the type of well treatment fluid utilized, various additives may also be added to the wellbore fluid to change the physical properties of the fluid or to serve a certain beneficial function. In one embodiment, a propping agent such as sand or other hard material is added which serves to keep the fractures open after the fracturing operation. Also, fluid loss agents may be added to partially seal off the more porous sections of the formation so that the fracturing occurs in the less porous strata. Other oilfield additives that may also be added to the wellbore treatment fluid include antifoams, scale inhibitors, $H_2S$ and or $O_2$ scavengers, biocides, surface tension reducers, breakers, buffers, surfactants and non-emulsifiers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors.

In exemplary embodiments, the wellbore treatment fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the storable composition using a gas, such as air, nitrogen, or carbon dioxide.

Method of Making the Gel Composition

In a third aspect, the present invention is a method of making a gel composition comprising an acrylamide polymer or copolymer crosslinked by dialdehyde.

In one embodiment, a method of making a gel composition comprises combining or contacting an acrylamide polymer or copolymer with a dialdehyde in an aqueous medium, wherein the molar ratio of dialdehyde to monomers of the acrylamide polymer or copolymer is in the range of about greater than about 0.2 to about 2.0, or from about 1 to 1.5, at a temperature and for a period of time sufficient to produce the gel composition.

The pH of the aqueous medium may vary. In one embodiment, the pH of the aqueous solution is greater than about 7.5, about 8.0, about 8.5, about 9.0, about 10.0, about 10.2, about 10.5, about 10.7, or about 11. In exemplary embodiments, the pH is in the range of about 7.5 to about 11, about 8.5 to about 11, about 9.0 to about 11, about 10 to about 11, or about 10.2 to about 10.7. In a particular embodiment, the pH is greater than about 9.0. The pH modifying agents which may be used to modify the pH of the gel or the composition in which the gel is formed are any pH modifying agents suitable, for example basic compounds, which are inert relatively to the polymer and the dialdehyde, for example inorganic compounds, such as alkaline and alkaline-earth hydroxides or salts, including but not limited to alkaline carbonate or phosphate.

In exemplary embodiments, acrylamide polymer or copolymer is provided in the form of a fine aqueous dispersion or emulsion of the acrylamide polymer or copolymer. In exemplary embodiments, the acrylamide polymer or copolymer component is about 0.1 to 1 wt. % of the acrylamide polymer or copolymer in the solution, dispersion or emulsion.

In exemplary embodiments, the dialdehyde is in the form of a dialdehyde in an aqueous solution. In exemplary embodiments, the acrylamide polymer or copolymer component and/or the dialdehyde component are each adjusted to a pH in the range of about 7.5 to about 11 prior the step of combining or contacting the components. In exemplary embodiments, the acrylamide polymer or copolymer component is prepared by shearing, agitating or stirring the acrylamide polymer or copolymer in an aqueous medium until a fine dispersion or emulsion is obtained. In exemplary embodiments, the pH of the fine aqueous dispersion or emulsion of the acrylamide polymer or copolymer is adjusted as desired, for example, adjusted to a pH in the range of about 7.5 to about 11.0. In exemplary embodiments, the step of combining or contacting the acrylamide polymer or copolymer with dialdehyde in an aqueous solution includes shearing, agitating or stirring the components to form a thoroughly blended mixture or a gel composition. In exemplary embodiments, the final pH of the mixture or gel composition is recorded, and then the gel is tested for viscosity in a rheometer (e.g. a Grace Instrument M5600 HPHT Rheometer).

In exemplary embodiments, the aqueous solution may be in the form of an aqueous liquid, an aqueous emulsion, an aqueous dispersion or an aqueous slurry.

The period of time sufficient to produce the gel composition may vary. In exemplary embodiments, the formation of the gel composition or the crosslinking of the acrylamide polymer or copolymer and dialdehyde occurs in less than about 1 hour, about 40 minutes, about 30 minutes, or about 20 minutes or less than about 10 minutes, or less than about 5 minutes.

The temperature to produce the gel composition may vary. In one embodiment, the gel composition is produced at a temperature of greater than or equal to about 20° C., about 30° C., about 40° C., about 50° C., about 60° C., about 70° C., about 80° C., or about 90° C. In exemplary embodiments, the gel composition is produced in a period of time of about 1 minute to about 24 hours, about 5 minutes to about 2 hours, or about 10 minutes to about 1 hour.

In one embodiment, a method to produce a gel composition comprises combining or contacting an acrylamide polymer or copolymer, or a fine aqueous dispersion or emulsion of the acrylamide polymer or copolymer, with dialdehyde in an aqueous solution at a pH in the range of about 7.5 to about 11, wherein the molar ratio of dialdehyde to monomers of the acrylamide polymer or copolymer is in the range of about greater than about 0.2 to about 2.0, at a temperature and for a period of time sufficient to produce the gel composition.

In certain embodiments, the method of producing the gel composition comprises combining or contacting an acrylamide polymer or copolymer with dialdehyde in an aqueous solution at a pH in the range of about 7.5 to about 11, at a temperature and for a period of time sufficient to produce a gel composition, wherein the gel composition is partially cross-linked before it is added to the wellbore and then becomes fully-crosslinked in situ.

Methods of Treating Wellbores

In another aspect, the present invention is a method of treating a wellbore using a gel composition.

In exemplary embodiments, a method of treating a wellbore comprises injecting a gel composition described herein into a wellbore. In exemplary embodiments, the gel composition is at least partially pre-formed and subsequently injected into the wellbore. In another embodiment, the gel composition is formed in situ.

In exemplary embodiments, a method of treating a wellbore comprises injecting a composition comprising an acrylamide polymer or copolymer into a wellbore; injecting a composition comprising dialdehyde into the wellbore, and injecting a pH modifying agent into the wellbore in an amount sufficient (or calculated to be sufficient) to produce a downhole solution pH in the range of about 7.5 to about 11, to produce an in-situ gel composition comprising an acrylamide polymer or copolymer crosslinked with dialdehyde.

In exemplary embodiments, the wellbore treatment fluid or gel composition may be used for carrying out a variety of subterranean treatments, including, but not limited to, drilling operations, fracturing treatments, and completion operations (e.g., gravel packing). In exemplary embodiments, the wellbore treatment fluid or gel composition may be used in treating a portion of a subterranean formation. In exemplary embodiments, the wellbore treatment fluid or gel composition may be introduced into a well bore that penetrates the subterranean formation. In exemplary embodiments, the wellbore treatment fluid or gel composition may be used in fracturing treatments.

The wellbore treatment fluids and gel compositions of the present embodiments may be used in any subterranean treatment as desired. Such subterranean treatments include, but are not limited to, drilling operations, stimulation treatments, and completion operations. Those of ordinary skill in the art, with the benefit of this disclosure, will be able to recognize a suitable subterranean treatment where friction reduction may be desired.

In exemplary embodiments, the wellbore treatment fluid, gel compositions and methods can be used in or injected into fresh water, salt water or brines.

In exemplary embodiments, wellbore treatment fluid, gel compositions and methods can be used within a temperature range of about 20° C. to about 205° C., about 50° C. to about 200° C., or about 70° C. to about 200° C.

In exemplary embodiments, a method of fracturing a subterranean formation comprises: providing a wellbore treatment fluid or gel composition according to the present embodiments; and placing the wellbore treatment fluid or gel composition into a subterranean formation so as to create or enhance a fracture in the subterranean formation.

In exemplary embodiments, a method of fracturing a subterranean formation comprises: providing a wellbore treatment fluid or gel composition according to the present embodiments; and pumping the wellbore treatment fluid or gel composition so as to form or extend a fracture in the subterranean formation and deposit the wellbore treatment fluid or gel composition in the fracture.

In exemplary embodiments, the method further comprises allowing the gel composition in the fracture to break. In exemplary embodiments, the gel composition breaks without the addition of breaking agents or breakers. In exemplary embodiments, the method further comprises the addition of breaking agents or breakers. Representative, non-limiting examples of breakers include persulfates of ammonium, sodium and potassium, sodium perborate, hydrogen peroxide, organic peroxides, percarbonates, perphosphates, organic acids, perphosphate esters, amides, ammonium sulfate, enzymes, copper compounds, ethylene glycol, glycol ethers, and combinations thereof The following examples are presented for illustrative purposes only, and are not intended to be limiting.

EXAMPLES

Example 1

Preparation and Viscosity Analysis of Exemplary Glyoxal-Crosslinked-Polymer Gels Exemplary gels were prepared by the following protocol. About 0.4 wt % of active acrylamide polymer in water was stirred for about 10 minutes to about 20 minutes at room temperature. Once the solution was thoroughly blended, the pH of the solution was measured and adjusted using a pH buffer solution to about 9.8 to about 10.3. 0.33, 0.49 or 0.65 wt. % of glyoxal was added to the solution. The mixture was stirred until the glyoxal was well incorporated. The viscosity of each of the resulting gels was measured on a Grace Instrument M5600 HPHT Rheometer at 180° F.

The Grace Instrument M5600 HPHT Rheometer which is a true Couette, coaxial cylinder, rotational, high pressure and temperature rheometer. The instrument is fully automated and all data acquisition is under computer control. The temperature of the sample is maintained with an oil bath which runs from ambient to 500° F. The gel is also subjected to pressure with nitrogen gas to prevent boiling off the solvent. After 20 minutes of shear conditioning, the gel is subjected to a shear sweep which can be programmed in the software that accompanies the Rheometer. The data acquired from the computer is processed and plotted as desired.

Figure 1:
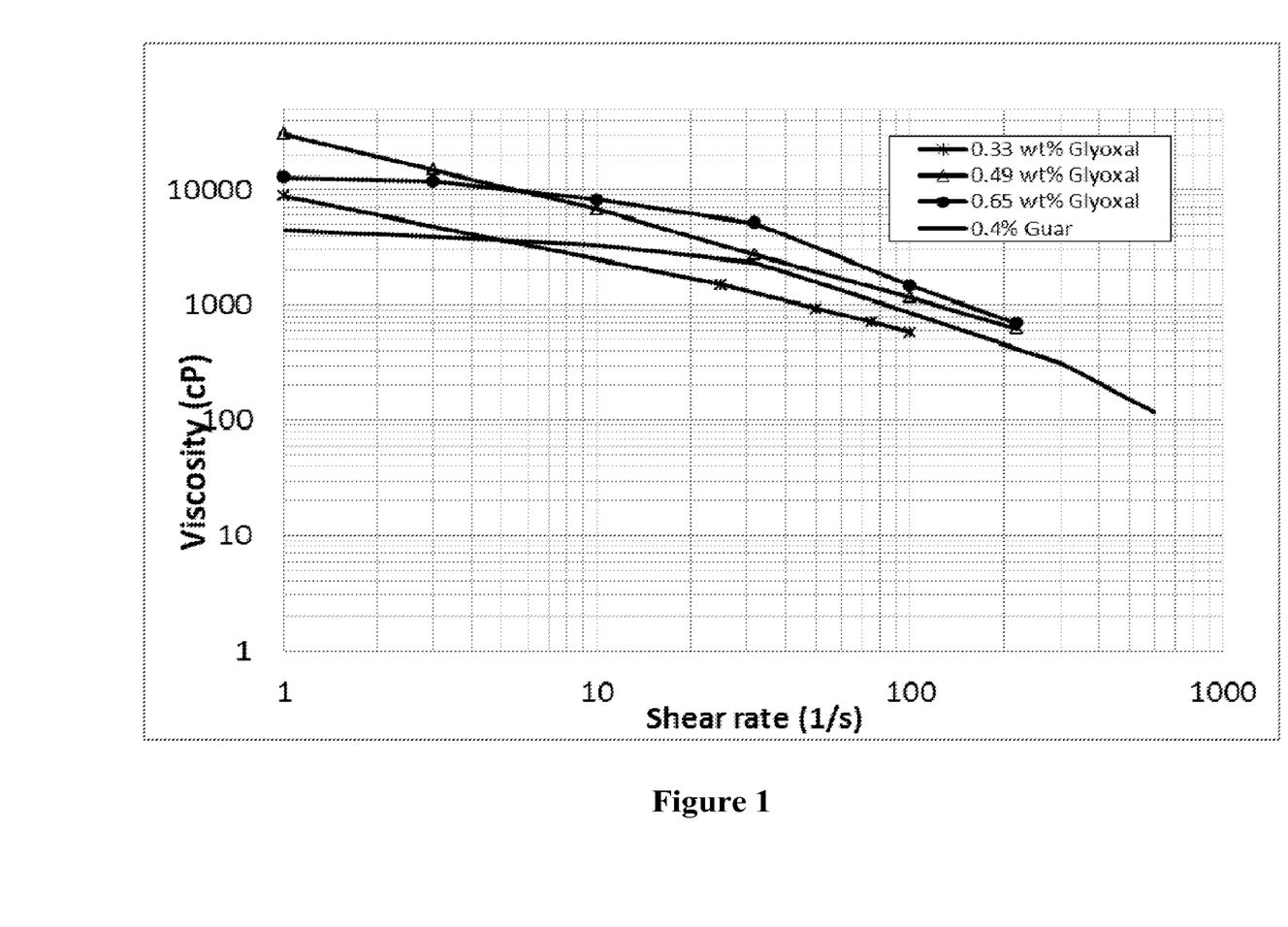
FIG. 1 provides a graph showing the results of the viscosity analyses for exemplary gels according to the embodiments and a guar gel.

FIG. 1 shows the viscosity analyses of three exemplary gels and, for comparison, a guar gel.

Example 2

Charge-Viscosity Analysis of Exemplary Dry and Emulsion Glyoxal-Crosslinked-Polymer Gels The compositions were prepared by adding 200 mL of 2% KCl to a Waring blender jar. 0.3% of active acrylamide copolymer was added along with the pH buffer and mixed for a few minutes. 0.33% glyoxal was added (to provide a molar ratio of glyoxal to monomer of about 1.35) and blended for a few seconds. The obtained crosslinked gel was evaluated on an Anton Paar Physica Rheometer setup with concentric cylinder geometry. The gel was sheared at a constant shear rate of 100 $s^{-1}$ and at a temperature of 180° F. The viscosity reported in the table is an average reading measured over 30 minutes.

Analysis of Charge-Viscosity was evaluated for a range of dry PAM (DPAM), partially hydrolyzed PAM (HYPAM) and emulsion PAM (EPAM) polymers. Series were arranged in three groups with increasing charges for each group.

TABLE 2

Viscosity of Exemplary Dry and Emulsion
Glyoxal-Crosslinked-Polymer Gels

| Sample# | Product Form | Charge (mole %) | Viscosity (cP) |
|---|---|---|---|
| 1 | DPAM | 2 | 5 |
| 2 | DPAM | 13 | 463 |
| 3 | DPAM | 23 | 343 |
| 4 | DPAM | 33 | 33 |
| 5 | DPAM | 53 | 14 |
| 6 | HYPAM | 3 | 18 |
| 7 | HYPAM | 10 | 677 |
| 8 | HYPAM | 15 | 1326 |
| 9 | HYPAM | 20 | 463 |
| 10 | HYPAM | 30 | 118 |
| 11 | HYPAM | 40 | 57 |
| 12 | EPAM | 5 | 44 |
| 13 | EPAM | 10 | 412 |
| 14 | EPAM | 15 | 818 |
| 15 | EPAM | 20 | 475 |
| 16 | EPAM | 30 | 306 |
| 17 | EPAM | 40 | 32 |

Conditions: 0.3% active polymer, crosslinked with 0.33% glyoxal, in 2% KCl solution.

Figure 2:
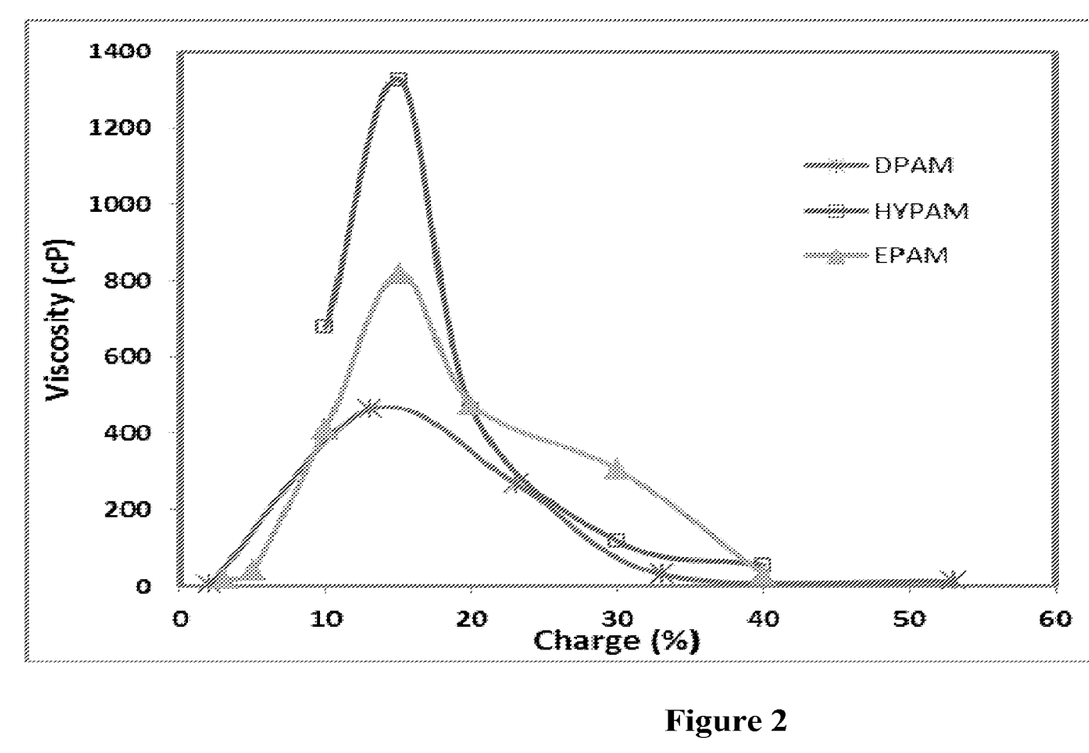
FIG. 2 provides a graph showing the relationship between charge and viscosity for anionic copolymers at various charges.

Based on viscosity under the testing conditions (shear rate 100 sec$^{-1}$ at 180 F), there is an influence of charge on gel viscosity and performance. An optimum range of the charge appears to be in the 15-20 mole % range. This charge effect is unexpected because one would expect to have increasingly better performance (viscosity) with decreasing charge (which means more acrylamide units available for the crosslinking reaction with glyoxal). To the contrary, an optimum range of the charge appears to be in the 15-20 mole % range. The results of the charge-viscosity analysis are shown graphically in FIG. 2.

Example 3

Static Proppant Settling of PAM Versus Guar

The Static Proppant Settling Column test was used to evaluate settling time of proppants in PAM. This test used a 250 mL graduated cylinder with a proppant loading of 4 lb/gal with a 20/40 mesh. Proppant was blended with the crosslinked PAM using a blender for 10-30 seconds until well mixed. The downward mobility was measured as a function of time.

| Sample Correlation to Viscosity Table in Example 1 | Type | Time (hours) | Initial height of sand (mL) | Final height of sand (mL) | Sand height (%) | Fluid containing suspended proppant (%) |
|---|---|---|---|---|---|---|
| 2 | DPAM | 0.5 | 100 | 100 | 0 | 100 |
|   |   | 17 | 100 | 100 | 0.00 | 100.00 |
| 3 | DPAM | 0.5 | 100 | 100 | 0 | 100 |
|   |   | 17 | 100 | 80 | 20.00 | 80.00 |
| 14 | EPAM | 0.5 | 100 | 100 | 0 | 100 |
|   |   | 17 | 100 | 100 | 0.00 | 100.00 |
| 15 | EPAM | 0.5 | 100 | 100 | 0 | 100 |
|   |   | 17 | 100 | 100 | 0.00 | 100.00 |
| 8 | HYPAM | 0.5 | 100 | 100 | 0 | 100 |
|   |   | 17 | 100 | 100 | 0.00 | 100.00 |
| 9 | HYPAM | 0.5 | 100 | 100 | 0 | 100 |
|   |   | 17 | 100 | 100 | 0.00 | 100.00 |
|   | Guar | 0.5 | 100 | 100 | 0 | 100 |
|   |   | 17 | 100 | 100 | 67 | 33 |

The results of this analysis demonstrate the ability of proppant to remain suspended in the polymer fluid.

We claim:

1. A method of treating a wellbore comprising injecting a gel composition comprising an acrylamide polymer or copolymer crosslinked with dialdehyde wherein the gel composition is formed by combining the acrylamide polymer or copolymer and dialdehyde in an aqueous solution at a pH in the range of about 9.0 to about 11, and wherein the acrylamide polymer or copolymer has a charge between about 15 to about 35%, and wherein the molar ratio of dialdehyde to monomers of the acrylamide polymer or copolymer is in the range of about 1.1 to about 2.0 into a wellbore.

2. A method of treating a wellbore comprising injecting a composition comprising an acrylamide polymer or copolymer into a wellbore; injecting a composition comprising dialdehyde into the wellbore, and injecting a pH modifying agent into the wellbore in an amount sufficient to produce a downhole solution pH in the range of about 9.0 to about 11, to produce an in-situ gel composition comprising an acrylamide polymer or copolymer crosslinked with dialdehyde and wherein the acrylamide polymer or copolymer has a charge between about 15 to about 35%, and wherein the molar ratio of dialdehyde to monomers of the acrylamide polymer or copolymer is in the range of about 1.1 to about 2.0.

3. The method of claim 2, wherein the pH is in the range of about 10 to about 11.

4. The method of claim 2, wherein the dialdehyde wherein the dialdehyde is selected from the group consisting of glyoxal, malondialdehyde, succindialdehyde, glutaraldehyde, adipaldehyde, o-phthaldehyde, m-phthaldehyde, p-phthaldehyde, and mixtures thereof.

5. The method of claim 1, wherein the acrylamide polymer or copolymer has a charge between about 15 to about 20%.

6. The method of claim 2, wherein the acrylamide polymer or copolymer has a charge of between about 15 and about 20%.

7. The method of claim 1, wherein the composition comprising an acrylamide polymer or copolymer is in a wellbore fluid composition.

8. The method of claim 2, wherein a wellbore fluid composition is formed in situ by (i) injecting a composition comprising dialdehyde into the wellbore; and (ii) injecting a pH modifying agent into the wellbore in an amount sufficient to produce a downhole solution pH in the range of about 9.0 to about 11; and where the injection of (i) and (ii) occurs simultaneously or sequentially, in any order.

9. The method of claim 1, wherein the pH is in the range of about 10 to about 11.

10. The method of claim 1, wherein the dialdehyde is selected from the group consisting of glyoxal, malondialdehyde, succindialdehyde, glutaraldehyde, adipaldehyde, o-phthaldehyde, m-phthaldehyde, p-phthaldehyde, and mixtures thereof.

11. The method of claim 1, wherein the dialdehyde is glyoxal.

12. The method of claim 2, wherein the dialdehyde is glyoxal.

13. The method of claim 7, wherein the wellbore fluid composition further comprises a proppant.

14. The method of claim 13, wherein the proppant is natural or synthetic proppants, selected from glass beads, ceramic beads, sand, gravel, and bauxite or combinations thereof.

15. The method of claim 7, wherein the wellbore fluid composition further comprises one or more oilfield additives selected from the group consisting of antifoams, scale inhibitors, $H_2S$ and or $O_2$ scavengers, biocides, crosslinking agents, surface tension reducers, breakers, buffers, surfactants and non-emulsifiers, fluorocarbon surfactants, clay stabilizers, fluid loss additives, foamers, friction reducers, temperature stabilizers, diverting agents, shale and clay stabilizers, paraffin/asphaltene inhibitors and corrosion inhibitors.

16. The method of claim 7, wherein the wellbore fluid composition further comprises one or more additives, including, but not limited to, acids, fluid loss control additives, gas, corrosion inhibitors, scale inhibitors, catalysts, clay control agents, biocides and friction reducers.

* * * * *